United States Patent [19]

Whetstone

[11] 4,129,159
[45] Dec. 12, 1978

[54] CHARGE FORMING AND DEPOSITING METHOD

[76] Inventor: Henry M. Whetstone, 282 St. George St., St. Augustine, Fla. 32084

[21] Appl. No.: 819,396

[22] Filed: Jul. 27, 1977

Related U.S. Application Data

[62] Division of Ser. No. 663,901, Mar. 4, 1976.

[51] Int. Cl.$^2$ ............................................... B65B 3/04
[52] U.S. Cl. ......................................... 141/1; 83/177; 425/437
[58] Field of Search ........................ 222/420, 421, 422; 425/437, 448, 209; 141/1, 67, 129; 83/177

[56] References Cited

U.S. PATENT DOCUMENTS

| 3,505,963 | 4/1970 | Westling | 83/177 |
| 3,877,497 | 4/1975 | Busi | 222/420 |

Primary Examiner—Houston S. Bell, Jr.
Attorney, Agent, or Firm—George H. Baldwin; Arthur G. Yeager

[57] ABSTRACT

A charge forming and depositing machine part particularly for sticky semi-liquid material including a rocking valve having sharp edges disposed between a supply hopper and a charge-measuring expansible chamber, a charge receiving cylinder having a port communicating with the chamber and controlled by a delivery piston in the cylinder, and the delivery piston being arranged to clear a measured charge of sticky semi-liquid candy or the like mixture from the cylinder, to carry it beyond the end of the cylinder and into contact with a receiving surface, and such delivery piston being provided with air blast means to release the measured charge from the lower end of the piston. The invention contemplates that the semi-liquid material may have nuts or the like solids mixed therein.

7 Claims, 6 Drawing Figures

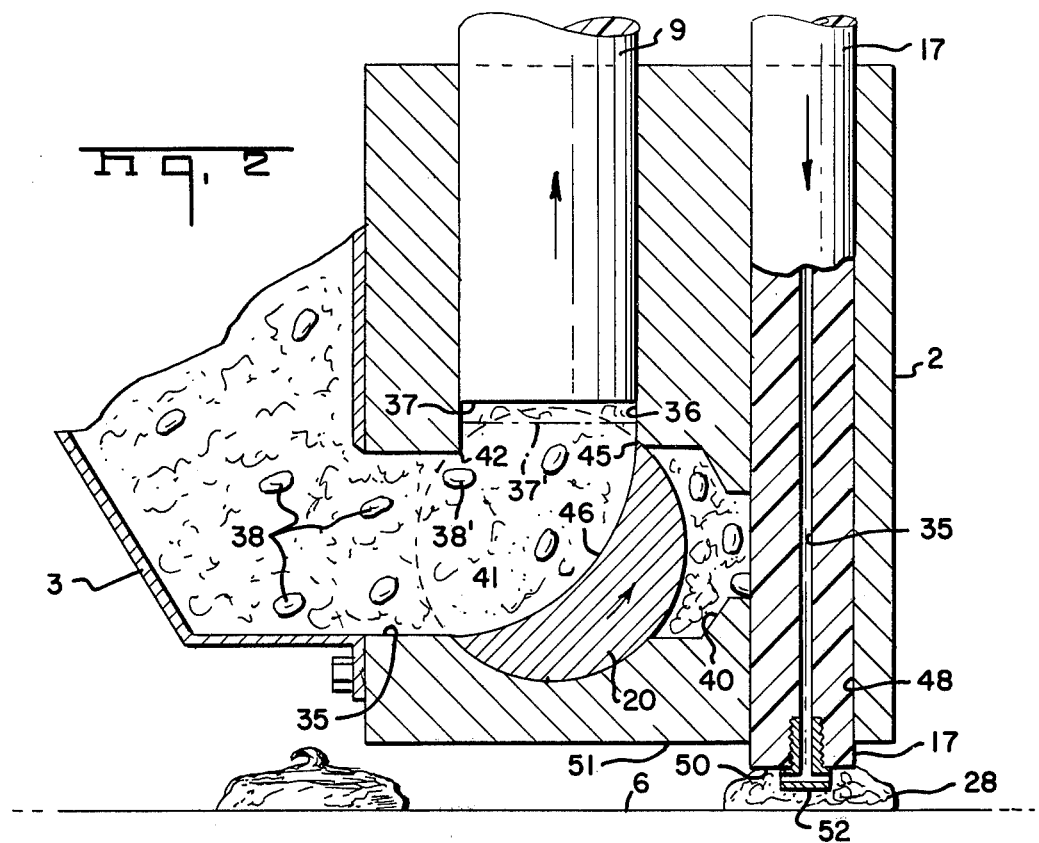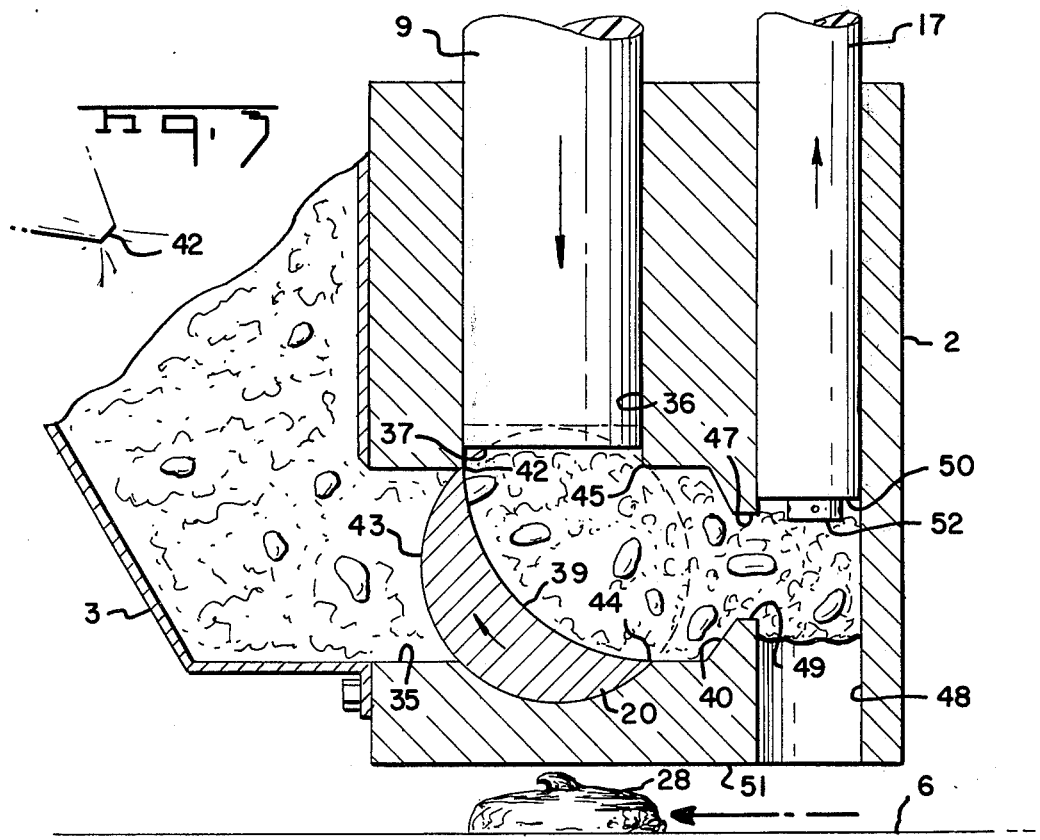

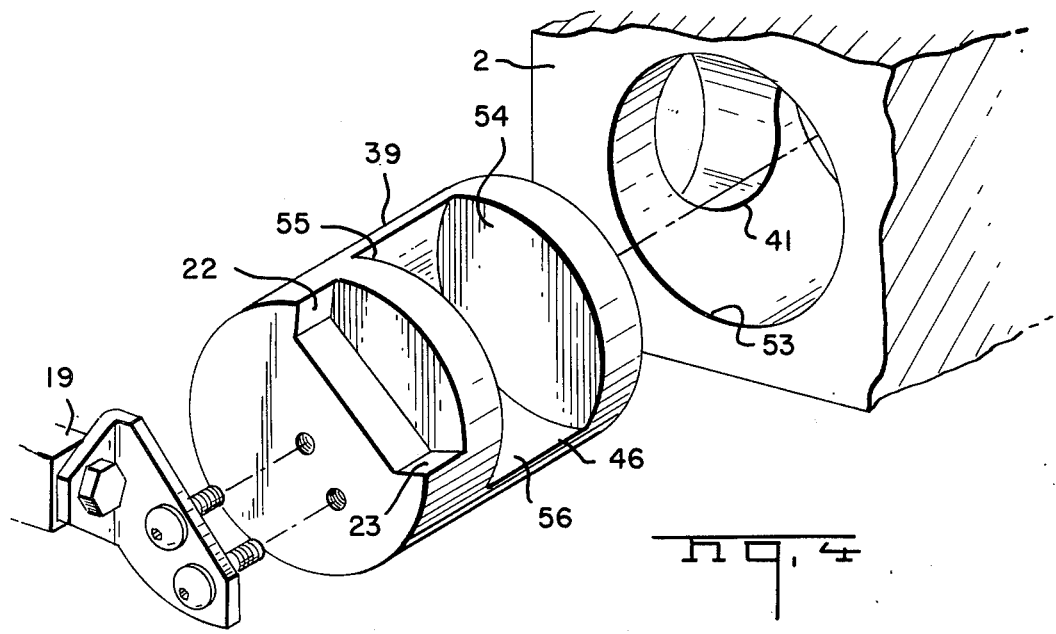
Fig. 4
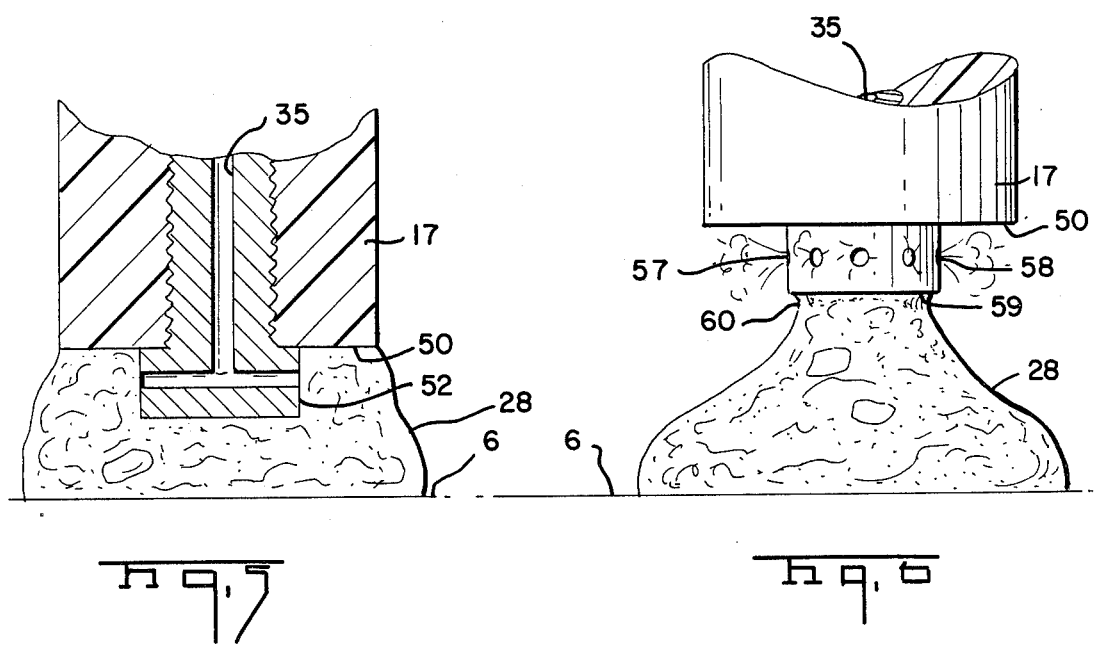
Fig. 5
Fig. 6

CHARGE FORMING AND DEPOSITING METHOD

This is a division of application Ser. No. 663,901 filed Mar. 4, 1976.

This invention relates to charge forming and depositing machines and methods, and particularly to machines for forming a measured charged of semi-liquid chocolate or the like and for depositing the measured charge on a belt or in a moving cup.

An object of the invention is to provide an improved charge forming and depositing machine.

A specific object of the invention is to provide an improved machine for forming and delivering measured charges of semi-liquid chocolate-nut mixtures.

Another specific object of the invention is to provide means for accurately depositing a measured charge of a sticky semi-liquid mass on a moving belt or into a moving cup with minimal after drip.

Other specific objects of the invention are to increase the speed of operation, improve the accuracy of measurement, reduce the tendency to clog and improve the shape of the delivered charge in charge forming machines, and particularly, machines for forming candy chocolate-nut patties or the like.

The invention is particularly adapted to forming measured charges of a sticky mass of semi-liquid chocolate or the like and depositing the measured charge on a belt or other receiving surface, or in a cup-like container, with minimal drip after the main charge is deposited, and with means to form an attractive curl on the top of the deposited charge. The invention contemplates use with a syrupy or thick-soupy chocolate or the like material, which may or may not contain nuts or the like solid materials.

A machine in accord with the preferred embodiment employs a large diameter cylindrical rocking valve, with a large transfer passage between its ends, disposed between a supply hopper and a large diameter measuring cylinder provided with a large diameter, short stroke piston. The rocking valve comprises sharp edges effective to slice through nuts in the material passing from the hopper into the measuring chamber and from this chamber into a small diameter delivery cylinder, that is to say, to slice through such nuts as happen to be in the way of the edges as the valve closes off one and the other of the inlet and outlet openings into the chamber. The valve rocks in each direction only far enough to just close off the passageway openings, thereby minimizing the chance of bits of nuts, or nut coats or integuments, from entering between the cylindrical outer surface of the valve member and the hollow cylindrical bore or valve chamber in which it is rotatably disposed and in which it rocks. The interior geometry of the machine is such that the materials passing through tend to scour the interior surfaces, and particularly to scour those surfaces on which bits of nuts or nut coats are likely to be formed or to tend to collect.

The transfer passage of the valve is large to minimize the cutting of nuts entrained in the chocolate material. The mixture thus passes through large and substantially unobstructed passageways from the hopper through the valve and measuring chamber and on into the delivery cylinder.

An object of the invention accordingly, is to provide a simple non-clogging machine capable of accurate measurement of charges of chocolate-nut mixtures, or other semi-liquid materials which may contain solid particles, or bits of flaky materials.

In delivering sticky chocolate charges to a belt, the shortcomings of various prior art machines are overcome, in accord with this invention, by carrying the charge on the lower end of a piston below the lower end of a delivery cylinder until the charge engages the belt surface, or the interior surface of a cup, and by only then raising the piston away from the charge. While this method has utility in certain cases, it may be further improved in accord with the invention by providing a short air blast, or spurt of air, across the lower end face of the piston as the piston starts its upward travel to break the suction between the face and the top of the charge being deposited. In accord with a further refinement, a small area of the piston face is not subjected to the spurt of air, and this small area drags a tail of the charge upward, which, when it finally pulls away, forms a curl on top of the deposited charge, similar to the curl typical of hand dipped chocolate bonbons.

In the prior art are various machines and methods relating to charge forming and delivering of liquids and semi-solids having some resemblance to the present machine and method, including U.S. Pat. No. 3,850,345 - Merritt, showing a measuring chamber and delivery piston; No. 2,893,609 - Spiess, Jr., et al, showing a rotary combination measuring and delivery valve and cylinder; and No. 2,074,041 - Baldwin, showing rocking valves and measuring and delivery piston and cylinder arrangements. Other U.S. patents relating to the handling of various types of material and having some similarity to elements of the invention include Nos: 23,515 - Turner; 1,346,077 - Carter; 1,987,748 - Norman et al; 2,854,170 - Borgardt et al; 3,227,325 - Bates; 3,327,640 - Townsend; 3,487,782 - Henrotte; and 3,580,302 - Riesenberg.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 2 is a sectional elevational view on an enlarged scale of a portion of the machine with the parts in positions corresponding to measured intake into a first chamber of the material to be deposited, and depositing a previously measured charge onto a receiving surface;

FIG. 3 is a similar view with parts in positions corresponding to forcing of a measured charge from the first chamber into the delivery cylinder;

FIG. 4 is an exploded detail view on a further enlarged scale of the rocking valve arrangement and related portions of the body of the machine;

FIG. 5 is a sectional elevational view on a still further enlarged scale showing details of the lower end portion of the delivery piston of the machine and of a charge being deposited thereby; and FIG. 6 is an elevational view of the lower end portion of the delivery cylinder on the scale of FIG. 5 showing the completing of the charge deposition.

Figure 1:
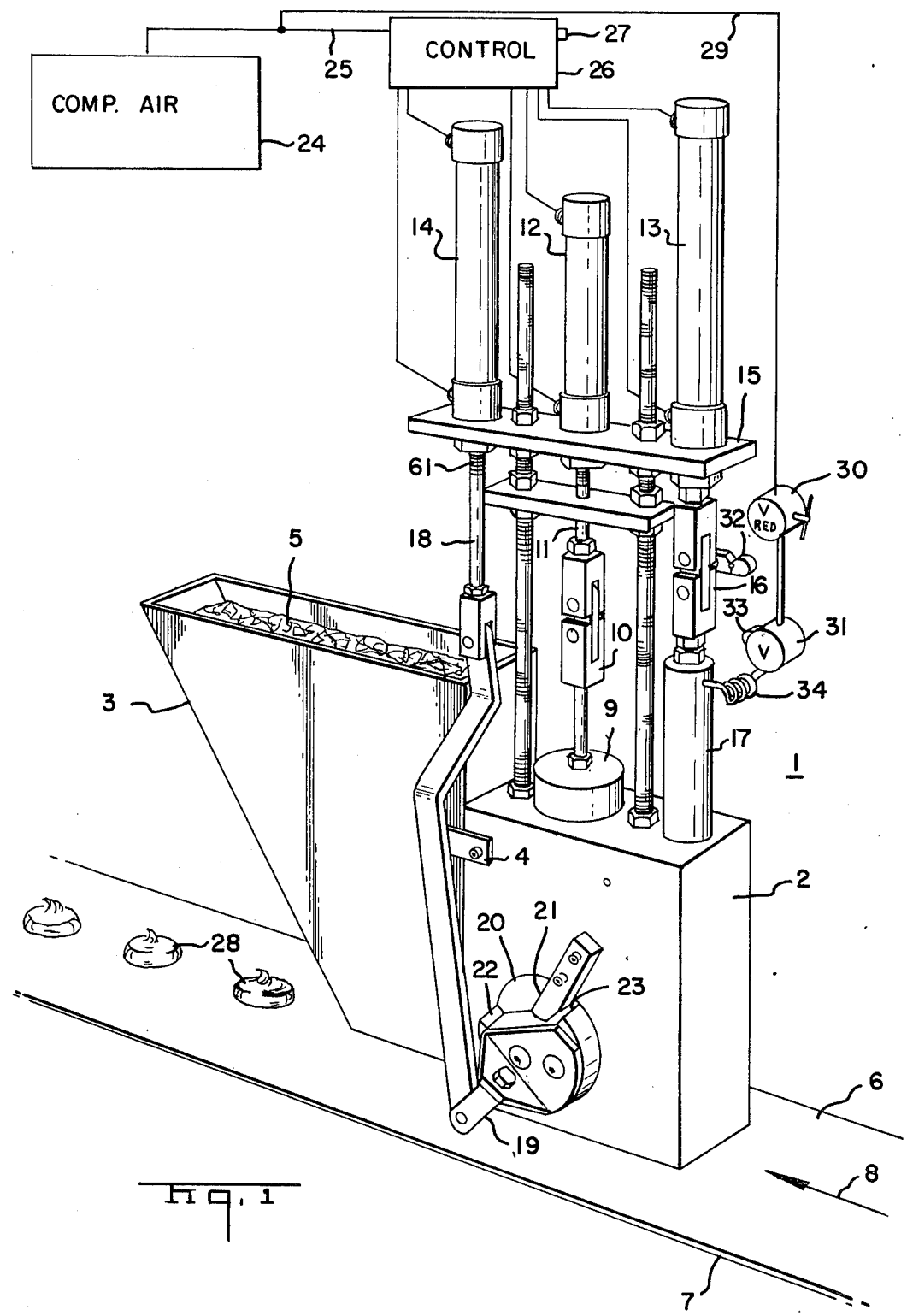
FIG. 1 is a prespective view of a charge forming and depositing machine embodying the invention, certain parts being schematically represented.

The machine 1 as shown in FIG. 1 comprises a body 2 and a hopper 3 attached thereto by means 4 and adapted to contain a supply or mass 5 of semi-liquid chocolate-nut mixture or the like. The body 2 is fixedly supported by means not shown in a position above the charge-receiving surface 6 of a conveyor belt 7 which is moved in the direction 8 by well known means (not shown). Should it be desired, a series of cups may be provided along the belt which are held down on the belt such as by rails above the upper side edges of the cups, and the charges may then be deposited in the cups.

Body 2 carries a charge-forming or measuring piston 9 which is reciprocated up and down by a linkage 10 connected to the piston rod 11 of air-actuated cylinder 12. Cylinder 12 and air-actuated cylinders 13 and 14 are carried by a framework 15 mounted to body 2. Piston rod linkage 16 of cylinder 13 is adjustable in length and is connected to delivery piston 17 to raise and lower it in body 2. Piston rod 18 of valve operating cylinder 14 is linked to crank arm 19 of a rocking valve member 20, which valve member opens and closes the connection between the interior of the hopper and an expansible chamber located in body 2 as later described. Stop 21 fixed to body 2, preferably by means permitting adjustment, limits the rotation of valve member 20 to the arc between shoulders 22 and 23 formed on the valve member.

Compressed air supply 24 is connected through an air line 25 to a control unit 26 which comprises, typically, an air logic system controlling valves for admitting compressed air from source 24 into connecting appropriate ends of cylinders 12, 13 and 14, and for connecting appropriate ends of the air cylinders to atmospheric exhaust 27, thereby to operate pistons 9 and 17 and valve 20 in desired sequence and timed relation, resulting in the depositing of a series of measured charges 28 on the surface 6. Other types of controls 26 for supplying compressed air to and permitting exhaust of air from the cylinders in programed sequence, such as electrical, electromechanical or mechanical control means, are known and may be employed as desired.

An additional compressed air line 29 from supply 24 leads through a manually adjustable pressure reducing valve 30 to a valve 31 which is opened by a trigger 32 carried by linkage 16. Specifically, trigger 32 is pivotally connected to pass operating element 33 of valve 31 on the downstroke but to contact and actuate element 33 after piston 17 has returned a short distance upwardly from its extreme lower limit extended position. Valve 31 is at that time opened briefly, normally for less than one, or no more than two or three seconds, and while open, supplies air through a flexible hose 34 into an air passageway in piston 17 as later described.

Referring now to FIG. 2, the hopper 3 connects through a bore or passageway 35 in body 2, which is controlled by valve member 20, into a charge forming expansible chamber 36. The valve member 20 provides a large unobstructed passage connecting from the hopper, and, with the valve in the position shown in this figure, charge forming piston 9, of which the face 37 constitutes the upper wall of chamber 36, is moved upwardly from its lowermost limit position, represented by broken lines 37', toward an upper limit position as shown in full lines. Chocolate, in which nuts 38 may be entrained to form mixture 5, completely fills the interior of transfer passageway 46 of valve 20 and chamber 36 up to the face 37 of piston 9. As the piston 9 moves through its upward stroke, an amount of mixture 5 equal to the piston displacement is drawn into chamber 36.

The control operates, when piston 9 is at the top limit of its stroke, to rock the cylindrical valve member or plug 20 from the position of FIG. 2, in which the cresent shaped closure portion 39 is so disposed as to close off outlet passageway 40 from chamber 36, into the position shown in FIG. 3, in which the closure portion 39 is in position to close off hopper or inlet passageway 35. The valve plug rocks in a counterclockwise direction from its FIG. 2 position to its FIG. 3 position, and thereafter rocks in a clockwise direction in returning to the FIG. 2 position.

It will be seen that the sharp edge 41 of the cresent-shaped closure portion 39 of the valve body 20 cooperates with the lip 42, at the top of the opening of passageway 35 into the chamber 36, to chop any of nut meats 38 which happen to be in the way. The lip 42 is made as narrow, and thus as sharp, as possible, and the clockwise limit position of the valve 20, that is, the position of FIG. 3, is so adjusted, such as by stop 21, that edge 41 does not pass beyond lip 42, whereby there is little or no chance of a small bit of a cut-off nut, or of a bit of a nut coat or integument, becoming jammed between lip 42 and the outer surface 43 of portion 39. Moreover, as the valve rocks away counterclockwise from its FIG. 3 hopper-closing position toward its FIG. 2 discharge position, any bits of solids which might be on the outer surface 43 of valve portion 39 are wiped off or secured away by the chocolate mass in hopper passageway 35. The opposite edge 44 of portion 39 is similarly sharp, has a limit position, shown in FIG. 2, similarly adjusted with respect to lip 45 at the top of outlet passageway 40, and any solid bits formed as edge 44 meets lip 45 would be wiped or scoured away against the chocolate in the outlet passageway 40 as the valve is thereafter rocked away clockwise from its FIG. 2 position.

It is to be noted that the interior cavity or transfer passageway 46 of valve member 20 is large and unobstructed, and constitues or contains most of the volume of the measuring chamber. In a typical machine, the piston 9 may have a diameter of 1.5 inches and a stroke of about 0.12 to 0.2 inches, thus to measure successive charges of between about 0.12 and 0.35 cubic inches. The volume of the cylindrical portion of the chamber 36 may expand from about 0.12 or 0.15 cubic inches, as measured from the lips 42, 45 to the face 37 of piston 9, when the piston is in its lower limit position shown in full lines in FIG. 3, to about 0.25 to 0.50 cubic inches when the piston is in its upper limit position shown in FIG. 2, while the passageway 46 of valve body 20 may have a volume of about 3 cubic inches. Thus the change in the volume resulting from raising of the piston 9 is only about 4% to 10% of the total volume of the expansible chamber, including the volume of the transfer passage 46.

The outlet passage 40 from the measuring or charge-forming chamber 36 is seen in FIGS. 2 and 3 to have a reduced throat 47 equal in diameter to the diameter of the cylindrical discharge cavity 48 in which depositing piston 17 reciprocates, such diameter being, typically, 0.75 inches. The opening 49 at which cylindrical throat 47 meets cylindrical cavity 48 constitutes a port which is open when piston 17 is at or near its upper limit position shown in FIG. 3, but which is closed whenever the lower delivery face 50 of piston 17 is below the port, as when it is in its lower limit position as shown in FIG. 2. In FIG. 3, the measuring piston 9 has, in its downward stroke, forced a measured charge of chocolate-nut mixture through outlet passageway 40, including throat 47 and port 49, into cavity or chamber 48 below face 50. In the subsequent lowering of piston 17, which is preferably initiated after valve 20 has closed off passageway 40, i.e. after valve 20 has returned to the position of FIG. 2, nuts 38 in the port may be chopped off between the piston face and the edge of the port. Any nut remnants which might tend to remain on the piston wall, however, will be wiped off against the mass of chocolate mixture in the throat at port 49 upon the next upward movement of the piston 17, assuming that such bits escape being wiped off against the body 2 as the piston 17 starts it return from its lower limit position.

Such lower limit position of piston 17 is shown in FIG. 2. In this position, the piston has carried the charge from the port area and deposited the charge as a patty 20 on the belt surface 6. The charge remains on the piston face 50 until the bottom of the charge has reached and become stuck to the belt surface. It is to be noted that the end face 50 is projected outwardly beyond the lower end of the delivery cylinder and below the lower surface 51 of the body 2, so that the upper part of patty 28 has not become stuck to any part of surface 51. Since the adhesion of the bottom of patty 28 to the belt surface is approximately equal to the adhesion of its top to the piston face 50, the patty tends to be pulled away from the face 50 as the piston 17 subsequently rises. While this countervailing adhesion forces thus created may be sufficient under some circumstances to cause release of the piston from the charge, the invention further contemplates the use of a puff of air, or a small momentary blast of air, to break the adhesion between the patty and the face 50, and a small projecting multiple air nozzle element 52 is provided on the piston 17 extending below its lower end face 50 for this purpose. As seen in FIG. 2, element 52 includes air passages constituting continuations of air passageway 35.

Certain details of the construction and assembly of the machine are to be seen in FIG. 4. The body 2 may be originally thru-bored and reamed to form valve chamber 53 which fittingly receives cylindrical valve member 20, and the vertical cylindrical bore is formed, not shown in this view, entering into chamber 53 to receive measuring piston 9. The bore 35 forming the passageway from the hopper is horizontally bored into the body 2 and this bore continues beyond the bore 53. The axes of the bore for piston 9 and the bore 35 intersect at a point on the axis of bore 53 midway between the wall surfaces 54, 55 which define the sides of the transfer passage 46 of valve member 20. The upright cylindrical discharge cavity identified at 48 in FIG. 3, is bored so as to have an upright, and typically vertical, axis lying in the plane defined by the axes of the bore 35 and of the piston 9 and, typically, parallel to the axis of piston 9. Typical diameters for piston 9 and bore or inlet passageway 35 are 1.5 inches, for bore 53, the valve chamber, is 2.25 inches, and for bore 48, the cylindrical delivery cavity, is 0.75 inches. The outlet passageway 40 shown in FIG. 3 constitutes in part a continuation of bore 35 of 1.5 inch diameter, such large diameter bore does not extend into cylinder 48. The passageway 40 is continued into cylinder 48, on the other hand, through a throat portion 47 of reduced diameter of, for example, 0.75 inches. Access permitting the boring out of throat 47 is afforded through bore 35 and acorss bore 53. Valve member 20 is machined or otherwise formed to provide shoulders 22 and 23, to carry crank arm 19, and to have transfer passageway 46 defined between parallel walls 54, 55, which are, typically, spaced apart by 1.5 inches, and the surface 56 of closure portion 39, which may be shaped as a cylindrical surface having 1.5 inch radius.

The machine body 2, valve member 20, the two pistons and the several other machine elements are conveniently made of aluminum, although other materials may be employed. While only one section of the machine is shown and described, it will be understood that, as is known in art, several side-by-side machines may be more desirable, and such side-by-side machines may operate in unison. To provide side-by-side machines, a single or unitary body may be formed to have several measuring and depositing cavities and chambers. In this case, the valve member 20 may be enlogated and the body may be provided with several separate transfer passages arranged therealong as appropriate. The control 26 may operate such a multiple machine to deposit simultaneously several charges 28 spaced across the belt.

In FIG. 5, the charge 28 is shown as engaged between the lower face 50 of depositing piston 17 at its lower limit position and the surface 6. As the piston starts to rise from its lower limit position, a puff of air, represented at 57, is supplied through passage 35 and issues from the multiple radially directed spaced nozzles 58 of nozzle element 52. Such a puff of air issuing from the several nozzle breaks the suction between the top of charge 28 and face 50. The nozzle element 52 may project about 0.12 inches below face 50, whereby the puff of air is virtually along face 50. The lower face 59 of the nozzle element is much smaller than face 50, and may have a diameter of between about one-quarter and one-half as great, for example. As the piston 17 rises, a small part 60 of the top of the patty 28 tends to be pulled up by the face 59, later to fall away and form a curl on the top of the patty.

The sequence of operation of the machine may best be followed by reference to FIGS. 2 and 3. With valve 20 in position to open completely transfer passageway 46 to hopper and to close off outlet passage 40, piston 9 rises to expand chamber 36 and suck a desired quantity of mixture in through passage 35. While the valve is in this position, piston 17 is lowered from its upper limit position past port 49 and on to its lower limit position. Such movements of the pistons 9 and 17 my be simultaneous or sequential as desired. After piston 17 has closed port 49 and with piston 9 in its upper limit position, the valve 20 is rotated to close off passageway 35 from the hopper and to connect or open outlet passageway 40 completely into the transfer passageway 46. When piston 17 has completed its downward depositing stroke and returned to its upper limit position, piston 9 is lowered to force the volume of charge corresponding to that sucked in on its upward stroke through outlet passageway 40, including throat portion 47 and port 49, into delivery cylinder 48 below face 50. The valve 20 may remain in this position pending the closing of port 49 by the next downward stroke of piston 17, or it may be rocked into position to close off passageway 40 before the downward movement of piston 17 has been initiated. In any case, the valve 20 is returned to the position of FIG. 2, before the charge measuring piston 9 begins its next upward movement.

In the interest of maintaining uniformity in the quantity of each charge, the whole interior from the hopper up to port 49 is continuously full of the chocolate or the like mixture with no air trapped in chamber 36 or in passageways 35 or 40.

The stroke of piston 9 may, conveniently, be made adjustable by providing an adjusting nut or screw threads 61 of shaft 18. The nut may limit the upward stroke of piston 9 by contact with the end of cylinder 14 or with a fixed part of framework 15. The cylinder 14 is fixed in a position such that the downward limit of rod 18 corresponds to the lower limit position of piston 9. The upper limit position of piston 17 may be established by contact of rod nut 62 with the framework 15, while the downward limit may correspond to the downward limit of the stroke of cylinder 13. Preferrably, linkage 16 is adjustable in length to provide further adjustment of the positions and limits of piston 17.

While the invention has been described with respect to a certain specific embodiment, it will be appreciated that many modifications and changes may be made by those skilled in the art without departing from the spirit of the invention. It is intended, therefor, by appended claims to cover all such modifications and changes as fall within the true spirit and scope of the invention.

What is claimed as new and what it is desired to secured by Letters of Patent of the United States is:

1. In the manufacture of candy patties, the method of depositing a measured charge of sticky semi-liquid candy or the like mixture on a generally horizontal surface disposed spacedly below the open lower end of an upright cylinder in which a reciprocable piston is disposed, comprising injecting a measured charge of such semi-liquid mixture through a side opening located above said lower end into said upright cylinder under the lower end face of said piston in retracted position in said cylinder, moving said piston downwardly sufficiently to move said lower end face past said side opening and therebeyond to carry such measured charge on its said face downwardly beyond said lower end of said cylinder and continuing such downward movement until such charge comes in contact with such surface, and thereafter raising said piston away from the charge so deposited on said surface and into said retracted position with its said end face above said side opening.

2. The method according to claim 1, and blowing gas under pressure across said face during said raising of said face.

3. The method according to claim 1, wherein said mixture is a chocolate mixture.

4. The method according to claim 1 wherein said surface is flat.

5. The method according to claim 1, and ejecting from said piston gas under pressure generally radially outwardly across a peripheral area of said face during said raising of said face.

6. The method according to claim 5 wherein said surface is flat.

7. The method according to claim 1 wherein such downward movement is continued until said lower end face is disposed spacedly below said lower end of said cylinder.

* * * * *